US008460118B2

(12) United States Patent
Anderson et al.

(10) Patent No.: US 8,460,118 B2
(45) Date of Patent: Jun. 11, 2013

(54) SHAFT ASSEMBLY FOR A GAS TURBINE ENGINE

(75) Inventors: Carney R. Anderson, East Haddam, CT (US); William R. Ganoe, Jr., Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 9 days.

(21) Appl. No.: 13/222,829

(22) Filed: Aug. 31, 2011

(65) Prior Publication Data

US 2013/0051986 A1 Feb. 28, 2013

(51) Int. Cl.
*F16C 3/02* (2006.01)
*F16B 39/10* (2006.01)

(52) U.S. Cl.
USPC .......................................................... 464/182

(58) Field of Classification Search
USPC ............... 464/182; 416/244 R; 403/355, 365, 403/383, DIG. 7, 316, 319, 359.5, 377; 411/190, 221, 353, 926, 940
See application file for complete search history.

(56) References Cited

U.S. PATENT DOCUMENTS

| | | | | |
|---|---|---|---|---|
| 3,762,455 | A | 10/1973 | Anderson, Jr. | |
| 3,844,323 | A * | 10/1974 | Anderson, Jr. | 411/190 |
| 5,085,548 | A | 2/1992 | Moyles | |
| 5,544,991 | A | 8/1996 | Richardson | |
| 5,618,143 | A * | 4/1997 | Cronin et al. | |
| 5,707,252 | A | 1/1998 | Meszaros | |
| 6,059,486 | A | 5/2000 | Latulipe | |
| 6,352,439 | B1 | 3/2002 | Stark et al. | |
| 7,371,050 | B2 * | 5/2008 | Pasquiet | 416/244 R X |
| 7,704,029 | B2 * | 4/2010 | Blais et al. | |
| 2008/0317594 | A1 | 12/2008 | Servant | |
| 2009/0238638 | A1 * | 9/2009 | Ruhlander | |
| 2010/0158699 | A1 | 6/2010 | Makuszewski | |
| 2011/0146298 | A1 | 6/2011 | Reinhardt et al. | |
| 2011/0176925 | A1 | 7/2011 | Anderson et al. | |

* cited by examiner

*Primary Examiner* — Gregory Binda
*Assistant Examiner* — Josh Skroupa
(74) *Attorney, Agent, or Firm* — O'Shea Getz P.C.

(57) ABSTRACT

A shaft assembly includes a shaft, a nut, a nut lock ring and a tubular nut support ring. The shaft includes a nut base mounted on the shaft, and a plurality of protrusions that extend radially out from the nut base. Adjacent protrusions are circumferentially separated by a gap. The nut lock ring includes a tubular ring base connected axially between a plurality of first lock tabs and a plurality of second lock tabs. The ring base is disposed on the nut base. Each first lock tab extends radially inward through a respective one of the notches. Each second lock tab extends axially through a respective one of the gaps. The nut support ring is disposed on the ring base.

16 Claims, 3 Drawing Sheets

SHAFT ASSEMBLY FOR A GAS TURBINE ENGINE

BACKGROUND OF THE INVENTION

1. Technical Field

This disclosure relates generally to a gas turbine engine and, more particularly, to a shaft assembly for a gas turbine engine.

2. Background Information

Various shaft assemblies for gas turbine engines are known in the art. One type of shaft assembly includes an engine shaft, a rotor disc, a stack nut and a stack nut lock. The rotor disc is mounted on the shaft between a shaft shoulder and the nut. The nut lock is disposed on the nut, and includes a plurality of protrusions. A first set of the protrusions extend into corresponding notches in the shaft. A second set of the protrusions extend into corresponding notches in the nut. The nut lock therefore interlocks the nut with the shaft and, thus, prevents the nut from rotating relative to the shaft during engine operation.

The aforesaid nut lock may be manufactured using a combined forging and machining process. The combined forging and machining process, however, typically involves long machining times, and requires relatively large quantities of material as the nut lock is machined out of the forging.

SUMMARY OF THE DISCLOSURE

According to an aspect of the invention, a shaft assembly is provided that includes a shaft, a nut, a nut lock ring and a tubular nut support ring. The shaft includes a nut base mounted on the shaft, and a plurality of protrusions that extend radially out from the nut base. Adjacent protrusions are circumferentially separated by a gap. The nut lock ring includes a tubular ring base connected axially between a plurality of first lock tabs and a plurality of second lock tabs. The ring base is disposed on the nut base. Each first lock tab extends radially inward through a respective one of the notches. Each second lock tab extends axially through a respective one of the gaps. The nut support ring is disposed on the ring base.

The nut lock ring may be manufactured from a length of metal tube stock or sheet metal. The nut support ring may be manufactured from a length of metal tube stock or sheet metal.

The foregoing features and the operation of the invention will become more apparent in light of the following description and the accompanying drawings.

DETAILED DESCRIPTION OF THE INVENTION

Figure 1:
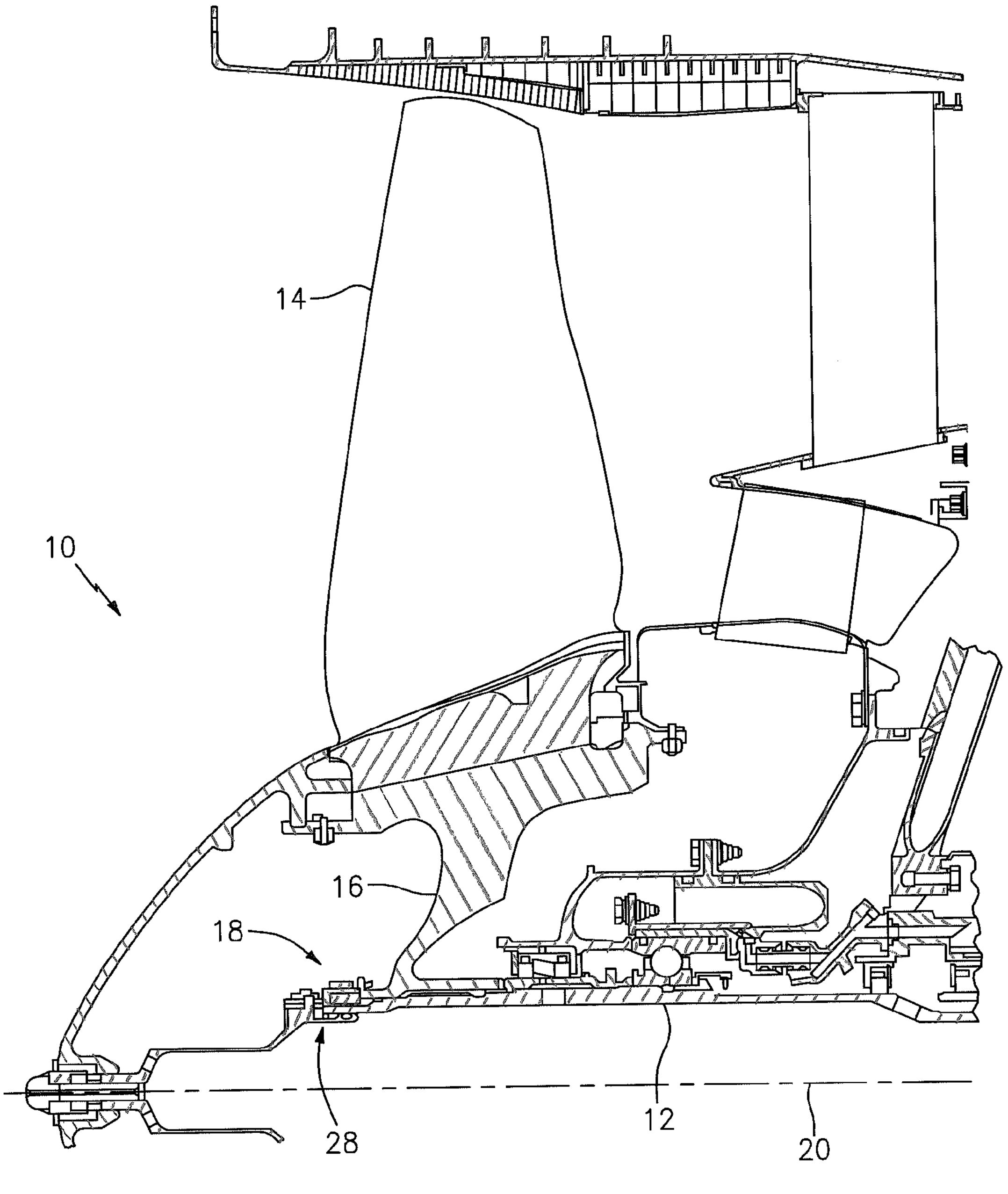
FIG. 1 is a cross-sectional illustration of a shaft assembly for a gas turbine engine.

FIG. 1 is a cross-sectional illustration of a shaft assembly 10 for a gas turbine engine. The shaft assembly 10 includes an engine shaft 12, a plurality of rotor blades 14 (e.g., fan blades) circumferentially disposed around and connected to a rotor disc 16, and a lock nut system 18.

Figure 2:
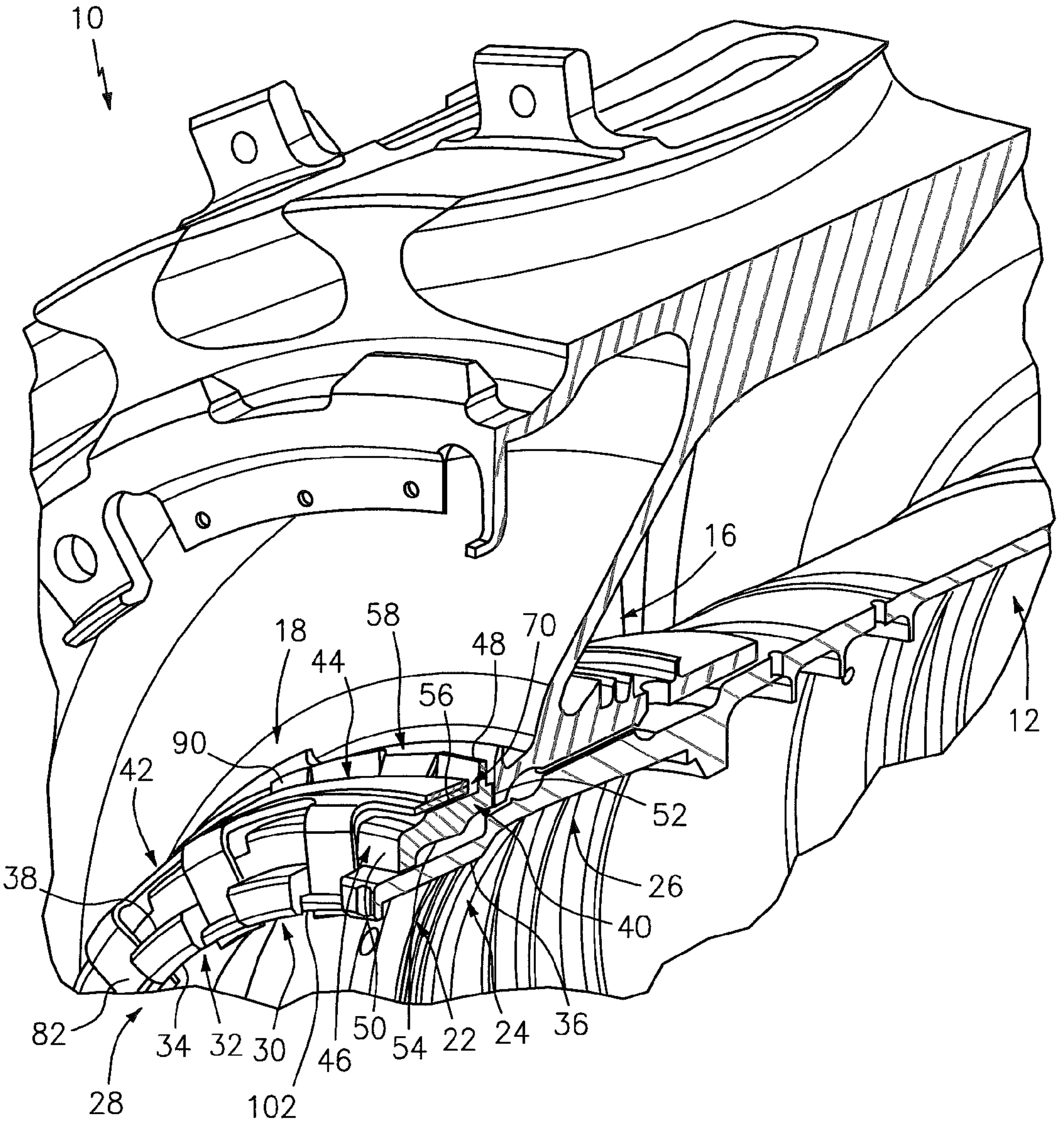
FIG. 2 is a cross-sectional perspective illustration of a portion of the shaft assembly illustrated in FIG. 1.

The shaft 12 is rotatable about an axial centerline 20. Referring to FIG. 2, the shaft 12 includes a castellated shaft segment 22, a threaded shaft segment 24 and a third shaft segment 26. The castellated shaft segment 22 extends axially from a first shaft end 28 to the threaded shaft segment 24 and it includes a plurality of retainer flanges 30 and a plurality of notches 32. Each retainer flange 30 extends radially inward from the shaft segment 22, at the first shaft end 28, to a distal flange end 34. The notches 32 extend axially into the first shaft end 28. The notches 32 extend radially between an inner radial shaft surface 36 and an outer radial shaft surface 38. The threaded shaft segment 24 extends axially from the shaft segment 22 to the third shaft segment 26.

The lock nut system 18 includes a nut 40 (e.g., a spanner nut), a nut lock ring 42 and a tubular nut support ring 44. The nut 40 includes a nut base 46 and a plurality of protrusions 48. The nut base 46 extends axially between a first nut end 50 and a second nut end 52, and extends radially between a threaded nut bore 54 and an outer radial lock ring contact surface 56. The protrusions 48 extend radially out from the nut base 46. The protrusions 48 are disposed axially between the lock ring contact surface 56 and the second nut end 52. The adjacent protrusions 48 are circumferentially separated by a gap 58.

Figure 4:
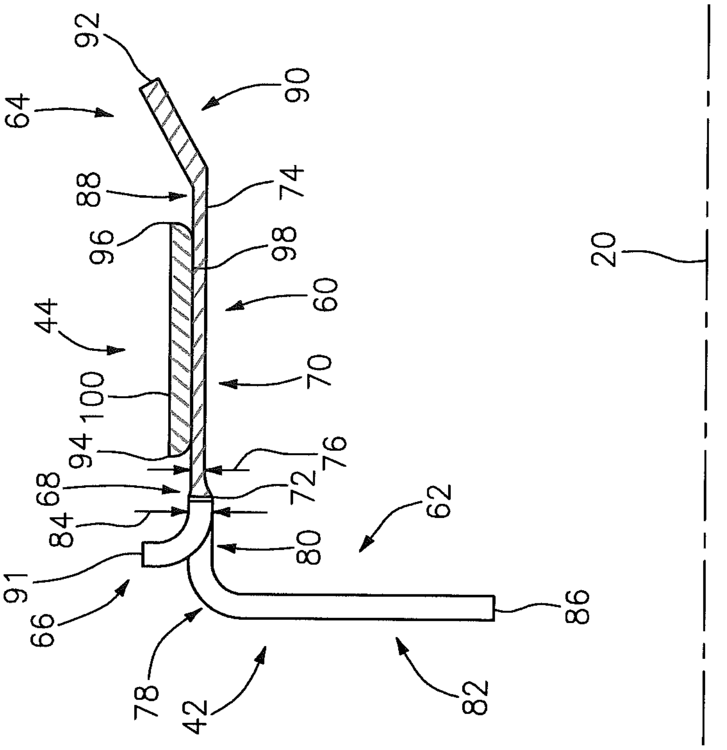
FIG. 4 is a cross-sectional illustration of the nut support ring and the nut lock ring illustrated in FIG. 3.
Figure 3:
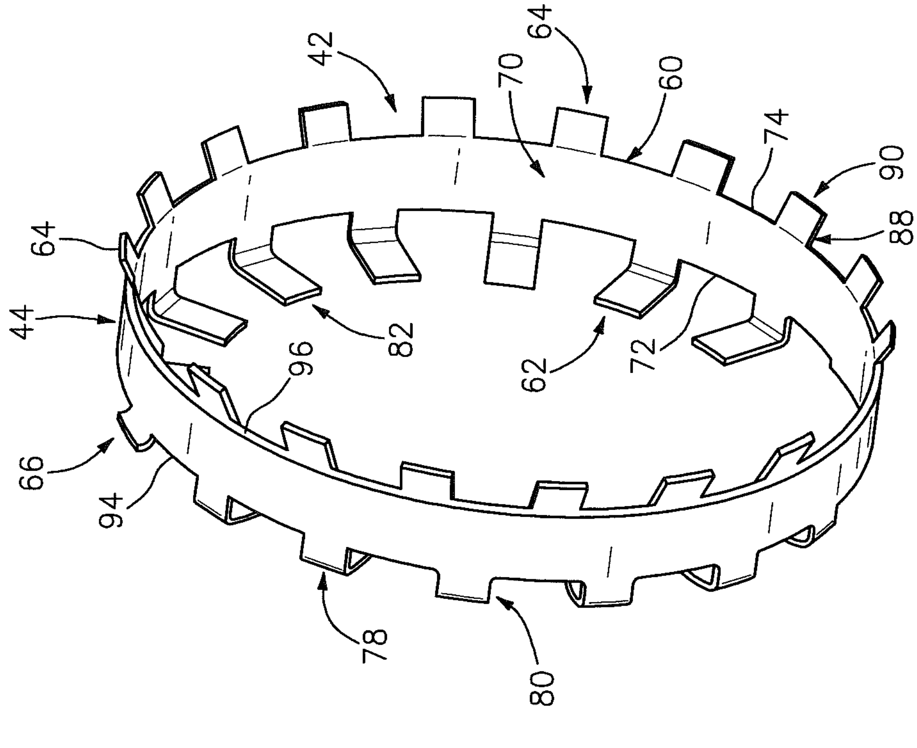
FIG. 3 is a perspective illustration of a nut support ring positioned on a nut lock ring.

Referring to FIGS. 3 and 4, the nut lock ring 42 includes a tubular ring base 60, a plurality of first lock tabs 62, a plurality of second lock tabs 64, and one or more third lock tabs 66. Referring to FIG. 4, the ring base 60 includes a transition segment 68 and a nut contact segment 70. The transition segment 68 extends axially from a first base segment end 72 to the nut contact segment 70. The nut contact segment 70 extends axially, for example substantially parallel to the centerline 20, from the transition segment 68 to a second base segment end 74. The nut contact segment 70 has a nut contact segment thickness 76.

Each first lock tab 62 includes a corner tab segment 78 connected between a first base tab segment 80 and a first end tab segment 82. The first base tab segment 80 extends axially, for example substantially parallel to the centerline 20, from the first base segment end 72 to the corner tab segment 78. The first base tab segment 80 has a base tab segment thickness 84 that is, for example, greater than or equal to the nut contact segment thickness 76. The first end tab segment 82 extends radially, for example substantially perpendicular to the centerline 20, from the corner tab segment 78 to a distal first lock tab end 86.

Each second lock tab 64 includes a second base tab segment 88 and a second end tab segment 90. The second base tab segment 88 extends axially, for example substantially parallel to the centerline 20, from the second base segment end 74 to the second end tab segment 90. The second end tab segment 90 extends axially from the second base tab segment 88 to a distal second lock tab end 92. The second end tab segment 90 may be canted radially outwards relative to the second base tab segment 88.

Each third lock tab 66 extends radially outwards from the first base segment end 72 to a distal third lock tab end 91. Referring to FIG. 3, each third lock tab 66 is disposed circumferentially between two respective first lock tabs 62.

Referring to FIG. 4, the nut support ring 44 extends axially between a first support ring end 94 and a second support ring end 96. The nut support ring 44 extends radially between an inner radial nut lock ring contact surface 98 and an outer radial support ring surface 100. The first support ring end 94 has an inner radial edge with an eased geometry (e.g., a bullnosed or chamfered geometry). The second support ring end 96 has an inner radial edge with an eased geometry (e.g., a bullnosed or chamfered geometry). The support ring surface 100 extends axially, for example parallel to the centerline 20, between the first support ring end 94 and the second support ring end 96.

Referring to FIG. 2, the rotor disc 16 is mounted onto the third shaft segment 26. The threaded nut bore 54 is screwed onto the threaded shaft segment 24 such that the second nut end 52 abuts the rotor disc 16, which axially secures the rotor disc 16 onto the shaft 12. The nut contact segment 70 is disposed on the lock ring contact surface 56. Each first end tab segment 82 extends radially through a respective one of the notches 32. Each second end tab segment 90 extends axially through a respective one of the gaps 58. Referring now to FIGS. 3 and 4, the nut support ring 44 is disposed on the nut contact segment 70, and axially between the third lock tabs 66 and the second lock tabs 64.

Referring again to FIG. 2, a retaining ring 102 may be disposed axially between the retainer flanges 30 and the first end tab segments 82 to axially secure the nut lock ring 42 onto the nut 40.

During engine operation, the nut lock ring 42 prevents the nut 40 from rotating relative to the shaft 12 and, thus, loosening or detaching from the shaft 12. The nut support ring 44 structurally reinforces the nut lock ring 42 and the nut 40. The nut support ring 44 may also aid in holding the nut 40 together where the nut 40 fractures.

The nut lock ring 42 may be manufactured (e.g., machined, cut, bent, etc.) from a length of metal tube stock. Alternatively, the nut lock ring 42 may be manufactured from sheet metal. The nut support ring 44 may be manufactured from a length of metal tube stock. Alternatively, the nut support ring 44 may be manufactured from sheet metal. By manufacturing (e.g., machining, cutting, bending, etc.) the nut lock ring 42 and/or the nut support ring 44 from tube stock and/or sheet metal, associated manufacturing time and waste material may be reduce relative to forging and machining a typical nut lock as described in the background.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A shaft assembly, comprising:

a shaft comprising a plurality of notches that extend axially into an end thereof;

a spanner nut comprising a nut base and a plurality of protrusions, wherein the nut base is mounted on the shaft, the protrusions extend radially out from the nut base, and adjacent protrusions are circumferentially separated by a gap;

a nut lock ring comprising a tubular ring base connected axially between a plurality of first lock tabs and a plurality of second lock tabs, wherein the ring base is disposed on the nut base, each first lock tab extends radially inward through a respective one of the notches, and each second lock tab extends axially through a respective one of the gaps; and a tubular nut support ring disposed on the ring base.

2. The shaft assembly of claim 1, wherein the nut support ring comprises an outer radial support ring surface that extends, substantially parallel to a centerline of the shaft, between a first support ring end and a second support ring end.

3. The shaft assembly of claim 1, wherein the nut support ring extends axially between a first support ring end and a second support ring end, and an inner radial edge of at least one of the support ring ends comprises an eased geometry.

4. The shaft assembly of claim 1, wherein each first lock tab comprises an axially extending first base tab segment and a radially extending first end tab segment, wherein the first base tab segment is connected between the ring base and the first end tab segment, and wherein the first end tab segment extends through the respective notch.

5. The shaft assembly of claim 4, wherein the ring base comprises a nut contact segment that contacts the nut base, and the nut contact segment comprises a nut contact segment thickness that is less than a base tab segment thickness of the first base tab segment.

6. The shaft assembly of claim 1, wherein each second lock tab comprises a second base tab segment and a second end tab segment, the second base tab segment extends axially between the ring base and the second end tab segment, the second end tab segment extends through the respective gap, and the second end tab segment is canted radially outwards relative to the second base tab segment.

7. The shaft assembly of claim 1, wherein the nut lock ring is manufactured from a length of tube stock.

8. The shaft assembly of claim 1, wherein the nut lock ring is manufactured from sheet metal.

9. The shaft assembly of claim 1, wherein the nut support ring is manufactured from a length of tube stock.

10. The shaft assembly of claim 1, wherein the nut support ring is manufactured from sheet metal.

11. The shaft assembly of claim 1, wherein the shaft comprises an engine shaft for a gas turbine engine.

12. The shaft assembly of claim 11, further comprising a rotor disc mounted on the shaft, wherein the nut axially secures the rotor disc onto the shaft.

13. A shaft assembly, comprising:

a shaft comprising a plurality of notches that extend axially into an end thereof;

a nut comprising a nut base and a plurality of protrusions, wherein the nut base is mounted on the shaft, the protrusions extend radially out from the nut base, and adjacent protrusions are circumferentially separated by a gap;

a nut lock ring comprising a tubular ring base connected axially between a plurality of first lock tabs and a plurality of second lock tabs, wherein the ring base is disposed on the nut base, each first lock tab extends radially inward through a respective one of the notches, and each second lock tab extends axially through a respective one of the gaps; and a tubular nut support ring disposed on the ring base;

wherein the nut lock ring further comprises a third lock tab connected to the ring base, wherein the third lock tab extends radially outward, and the nut support ring is disposed axially between the third lock tab and the second lock tabs.

14. The shaft assembly of claim 13, wherein the third lock tab is disposed circumferentially between two respective first lock tabs.

15. A shaft assembly, comprising:

a shaft comprising a plurality of notches that extend axially into an end thereof;

a nut comprising a nut base and a plurality of protrusions, wherein the nut base is mounted on the shaft, the protrusions extend radially out from the nut base, and adjacent protrusions are circumferentially separated by a gap;

a nut lock ring comprising a tubular ring base connected axially between a plurality of first lock tabs and a plurality of second lock tabs, wherein the ring base is disposed on the nut base, each first lock tab extends radially inward through a respective one of the notches, and each second lock tab extends axially through a respective one of the gaps; and a tubular nut support ring disposed on the ring base;

wherein the shaft further comprises a threaded shaft segment, and the nut base comprises a threaded nut bore that is mated with the threaded shaft segment.

16. A shaft assembly, comprising:

a shaft comprising a plurality of notches that extend axially into an end thereof;

a nut comprising a nut base and a plurality of protrusions, wherein the nut base is mounted on the shaft, the protrusions extend radially out from the nut base, and adjacent protrusions are circumferentially separated by a gap;

a nut lock ring comprising a tubular ring base connected axially between a plurality of first lock tabs and a plurality of second lock tabs, wherein the ring base is disposed on the nut base, each first lock tab extends radially inward through a respective one of the notches, and each second lock tab extends axially through a respective one of the gaps; and a tubular nut support ring disposed on the ring base;

wherein the shaft further comprises a retainer flange that extends radially inward at the end of the shaft, and a retaining ring is disposed axially between the retainer flange and at least one of the first lock tabs to axially secure the nut lock ring onto the nut.

* * * * *